United States Patent [19]
Heflinger et al.

[11] 3,828,275
[45] Aug. 6, 1974

[54] POLARIZED MULTIFREQUENCY LASER OSCILLATOR FOR HOLOGRAPHIC CONTOURING

[75] Inventors: Lee O. Heflinger, Torrance; Ralph F. Wuerker, Palos Verdes Estates, both of Calif.

[73] Assignee: TRW Inc., Redondo Beach, Calif.

[22] Filed: Nov. 30, 1972

[21] Appl. No.: 310,867

[52] U.S. Cl. .................................. 331/94.5, 356/2
[51] Int. Cl. ............................................ H01s 3/02
[58] Field of Search ......... 331/94.5; 350/3.5; 356/2, 356/106, 109

[56] References Cited
UNITED STATES PATENTS
3,482,184  12/1969  Schneider et al. ................ 331/94.5
3,603,684   9/1971  Wuerker ........................... 331/94.5

*Primary Examiner*—William L. Sikes
*Attorney, Agent, or Firm*—Daniel T. Anderson; Donald R. Nyhagen; Edwin A. Oser

[57] ABSTRACT

A multifrequency coherent light beam is generated containing two optical frequencies which may be polarized in different directions to permit separation of the two frequencies by a polarization beam splitter. The two frequencies may be generated simultaneously or consecutively. Contour holograms are recorded by splitting the polarized multifrequency coherent beam into a scene beam containing both optical frequencies and two separate reference beams each comprising one of the frequencies and directing each reference beam to the holographic recording medium at the optimum reference beam angle for the respective reference beam frequency.

35 Claims, 2 Drawing Figures

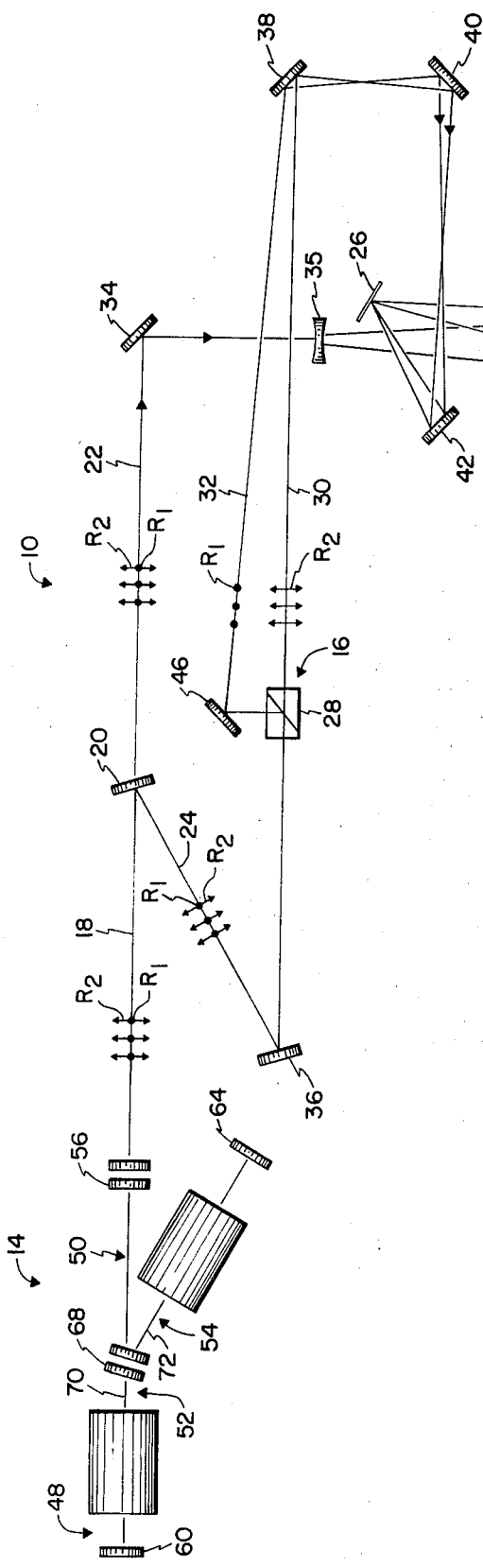
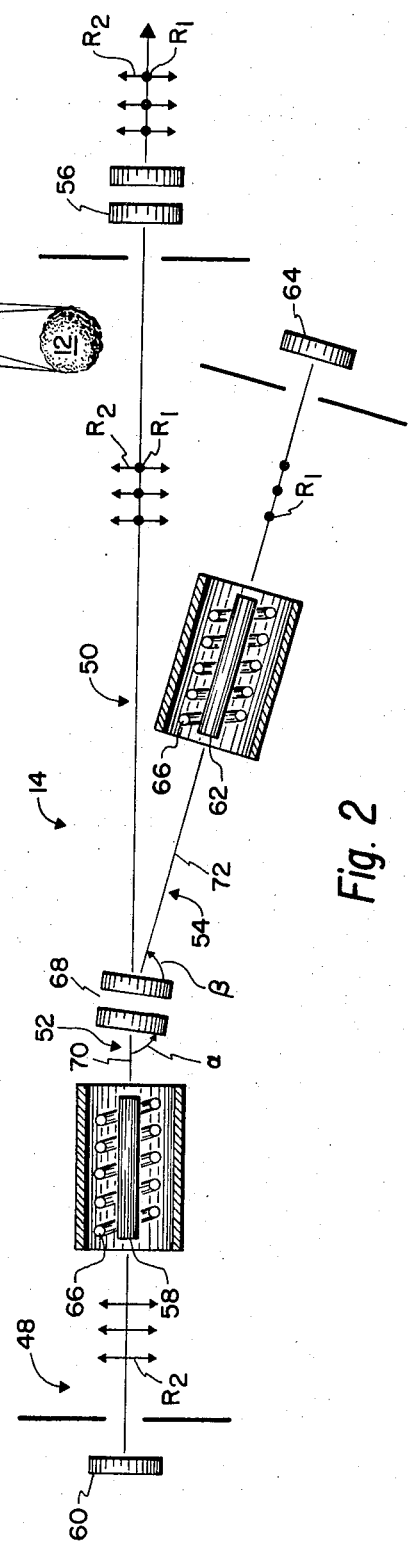
Fig. 1
Fig. 2

POLARIZED MULTIFREQUENCY LASER OSCILLATOR FOR HOLOGRAPHIC CONTOURING

RELATED APPLICATIONS

The present U.S. Pat. application is related to co-pending applications of Ralph F. Wuerker and Lee O. Heflinger, filed concurrently with Ser. No. 310,858, entitled "Multifrequency Laser Oscillator for Holographic Contouring," and Ser. No. 310,859, entitled "Multifrequency Laser Oscillator for Holographic Contouring," and assigned to TRW Inc.

BACKGROUND OF THE INVENTION

1. Field of the Invention

This invention relates generally to the field of holographic contouring and more particularly to a novel holographic method and apparatus for recording contour holograms utilizing polarized multifrequency coherent light. The invention relates also to a novel method and apparatus for generating multifrequency coherent light for recording contour holograms and other uses.

2. Prior Art

As is well known to those versed in the art of holography, holographic contouring involves recording a hologram of an object in such a way that the holographic image reconstructed from the hologram displays dark contour lines or bands, commonly referred to as contour fringes, from which the surface contour of the object may be determined with relatively high accuracy. The basic underlying principles of holographic contouring and the mechanics of implementing these principles are known and described in the open literature. For example, the basic principles of holographic contouring and holographic contouring apparatus are described in U.S. Pat. Nos. 3,603,684 and 3,603,685. Accordingly, it is unnecessary to elaborate on the basic principles of contouring in this disclosure.

Suffice it to say that holographic contouring involves holographically recording an object at two different coherent light frequencies and hence wavelengths on a single holographic recording medium. The recordings produced by the two frequencies create an interference pattern in the reconstructed holographic image which forms the contour fringes. As discussed in the above mentioned patents, the contour fringe spacing is a function of the difference between the wavelengths of the two coherent light frequencies.

These patents also discusss the fact that a contour hologram may be recorded on a recording medium by a single exposure of the medium at both wavelengths of coherent light simultaneously or by double exposure of the medium, i.e., exposure of the recording medium first at one coherent light frequency and then at the other light frequency. In the single exposure technique, the two light frequencies are generated simultaneously and recorded simultaneously on the recording medium. In the double exposure technique, the two light frequencies are generated and recorded separately on the recording medium. The two methods are equivalent and produce the same contour fringe pattern.

The single and double exposure techniques of recording contour holograms require different types of coherent light sources. Thus, the single exposure technique requires a coherent light source capable of generating two selected optical light frequencies simultaneously. The double exposure technique, on the other hand, requires a coherent light source capable of generating the two light frequencies consecutively, in rapid succession. The earlier mentioned U.S. Pat. Nos. 3,603,684 and 3,603,685, as well as U.S. Pat. No. 3,492,600, describe coherent light sources as these two different types.

One important aspect of the present invention is addressed to a problem which is common to both the single exposure technique and double exposure technique of recording contour holograms. This problem results from the fact that such recording requires a scene beam containing two different optical frequencies and two reference beams each comprising one of the frequencies. If the difference between these two frequencies is sufficiently small, it may be possible to record satisfactory contour holograms, that is contour holograms from which may be reconstructed holographic contour images or maps displaying resonably accurate contour fringes, utilizing the same reference beam angle for both reference beams.

On the other hand, maximum holographic contouring accuracy, and in some cases even formation of the contour fringes, requires direction of the two reference beams to the recording medium at slightly different angles, referred to herein as optimum reference beam angles, related to the respective reference beam frequencies. The relationship between reference beam frequency and optimum reference beam angle is well known to those versed in the holographic contouring art and hence need not be explained here. Suffice it to say that this requirement of different optimum reference beam angles for the two reference beams utilized in contour hologram recording presents the problem of splitting the single multifrequency coherent output beam from a multifrequency coherent light source or laser oscillator into a scene beam containing both optical frequencies to be used for recording and two separate reference beams each comprising one of the frequencies so as to permit the reference beams to be directed to the recording medium at their respective optimum reference beam angles.

While the above problem exists in both the single exposure and double exposure techniques of recording contour holograms, the problem is more easily resolved in the double exposure technique than in the single exposure technique, since in the double exposure technique the two optical frequencies are generated consecutively. Accordingly, the two frequencies are separated in time, and suitable adjustment may be made in the reference beam optics of the holographic contouring apparatus between the successive exposures at the two different frequencies to provide the optimum reference beam angle for each frequency. In the double exposure technique of recording contour holograms, however, this time separation of the two recording frequencies does not exist so that it is impossible to employ the above optical adjustment method of obtaining the different optimum reference beam angles.

Accordingly, from the standpoint of frequency separation to obtain optimum reference beam angles, the double exposure technique of recording contour holograms is superior to the single exposure technique. However, the single exposure technique has one distinct advantage over the double exposure technique. Thus, when recording a contour hologram by the double exposure technique, it is imperative that the object being recorded remain absolutely stationary between the successive exposures; that is to say, the object must remain stationary within a fraction of a wavelength of the coherent light. Accordingly, the double exposure technique is limited in application. Moreover, even in those applications for which the double exposure technique is suitable, the time interval between the successive exposures should be as brief as possible to minimize the possibility of movement of the object between exposures.

SUMMARY OF THE INVENTION

One important aspect of the present invention is concerned with a novel contour hologram recording method and apparatus which provide a multifrequency scene beam containing the two optical frequencies to be used for recording and two separate reference beams, each comprising one of the recording frequencies and having the optimum reference beam angle for its respective frequency. According to this aspect of the invention, a multifrequency coherent light beam containing the two optical recording frequencies is generated in such a way that the two frequencies are polarized in different directions or planes; that is to say, light waves of one of the frequencies are polarized to vibrate in one plane and light waves of the other frequency are polarized to vibrate in another plane. For convenience of description, the two light frequencies are assumed to be horizontally polarized and vertically polarized, respectively.

The polarized multifrequency coherent beam is optically split into a pair of separate multifrequency beams each containing both polarized frequencies of the original beam. One beam of this beam pair is utilized as a scene beam for illuminating the object whose contour hologram is to be recorded. The other beam of the beam pair is directed through a polarization beam splitter which separates the beam into two separate reference beams, one comprising only the horizontally polarized frequency and the other comprising only the vertically polarized frequency of the original beam. These two reference beams are directed to the holographic recording medium at the optimum reference beam angles for the respective reference beam frequencies.

The holographic recording medium is thus exposed by the multifrequency coherent light of the scene beam reflected from the object and by the single frequency coherent light of each reference beam to record in the medium a contour hologram of the object. The holographic contour image or map reconstructed from this contour hologram displays contour fringes having a spacing determined by the difference in wavelengths of the two differently polarized optical frequencies of the original multifrequency coherent beam. While the described contour hologram recording method and apparatus are particularly suited to recording contour holograms by the single exposure technique, which involves simultaneous generation of the two optical recording frequencies, the method and apparatus may also be employed to record contour holograms by the double exposure technique, wherein the two frequencies are generated consecutively.

Another aspect of the invention is concerned with a multifrequency coherent light source or laser oscillator for generating a multifrequency coherent light beam for use in the contour hologram recording method and apparatus of the invention as well as other applications.

This laser oscillator has a Y cavity with two rear legs containing lasing media, such as rubies, and frequency selecting means for selecting the two optical frequencies used for recording contour holograms by effecting lasing of one medium at one frequency and lasing of the other medium at the other frequency. A unique feature of the described laser oscillator resides in the use of an intercavity etalon for selecting the two recording frequencies. This etalon is utilized in a transmission mode to select one recording frequency and in a reflection mode to select the other recording frequency.

The described laser oscillator may be operated to generate two optical frequencies simultaneously or consecutively. The crystal axes of the two laser crystals may be located in the same or parallel planes to provide the two light frequencies with the same directions of polarization, as may be utilized in the contour recording techniques of the earlier mentioned copending application, or in intersecting or orthogonal planes to provide the two frequencies with different directions of polarization, as required in the present contour recording technique.

As will appear from the ensuing description, the invention may utilize various lasing media and various coherent light frequencies. The particular embodiments of the invention described employ a ruby lasing medium generating coherent light of the $R_1$ and $R_2$ spectroscopic transistions or wavelengths of the resonant fluorescence of the ruby.

BRIEF DESCRIPTION OF THE DRAWINGS

FIG. 1 illustrates a holographic contouring apparatus according to the invention; and FIG. 2 illustrates a laser oscillator according to the invention for use in the holographic recording apparatus of FIG. 1 and other uses.

DESCRIPTION OF THE PREFERRED EMBODIMENTS

Referring first to FIG. 1, there is illustrated a holographic contouring apparatus 10 according to the invention for recording contour holograms of an object 12. Contouring apparatus 10 comprises a multifrequency coherent light source or laser oscillator 14 and holographic optics 16, each uniquely arranged in accordance with the present invention. Laser oscillator 14 will be described presently and, or convenience, has been shown in simplified form in FIG. 1. Suffice it to say at this point that the laser oscillator generates an orthogally polarized multifrequency coherent output light beam 18 containing two components of differing frequencies or frequency ranges, corresponding to different spectroscopic transistions of the active lasing means, and differing polarization. For convenience, beam 18 is hereafter referred to in places as the source beam.

As mentioned earlier and will be discussed in more detail later, the contour hologram recording apparatus 10 may utilize various lasing media and various coherent light frequencies but is described in connection with ruby lasing media generating coherent light of the $R_1$ and $R_2$ spectroscopic transitions or wavelengths of the ruby resonant fluorescence. For this reason, the two spectroscopic transition or frequency components of the source beam 18 are designated in FIG. 1 by the reference characters $R_1$ and $R_2$ and are referred to herein simply as $R_1$ and $R_2$ frequencies. In the ensuing description, it is assumed that the $R_2$ frequency is vertically polarized, i.e., the light waves of the $R_2$ frequency vibrate in the plane of FIG. 1, and that the $R_1$ frequency is horizontally polarized, i.e., the light waves of the $R_1$ frequency vibrate in a plane normal to the plane of FIG. 1, as indicated in the figure.

Located in the path of the polarized multifrequency source beam 18 is an optical beam splitter 20, such as a glass plate oriented at an angle other than Brewster's angle relative to the beam path. This beam splitter partially transmits and partially reflects both frequencies $R_1$ and $R_2$ of the source beam 18 to provide a pair of polarized multifrequency output beams 22 and 24 each containing both the $R_1$ and $R_2$ frequencies of the source beam. Transmitted beam 22 is utilized as a scene beam for illuminating the object 12 whose contour hologram is to be recorded on a holographic recording medium 26. This recording medium may comprise any conventional holographic recording medium, such as a photographic film or plate or sheet of photochromic material. The reflected beam 24 is directed through a polarization beam splitter 28 which splits the beam into two separate reference beams 30 and 32, each comprising one of the original source beam frequencies $R_1$ or $R_2$. The illustrated polarization beam splitter for example, is a Glan polarizer which transmits the vertically polarized frequency $R_2$ to provide the reference beam 30 and reflects the horizontal frequency $R_1$ to provide the reference beam 32. These reference beams are directed to the recording medium 26 in such a way that each beam arrives at the medium at the optimum reference beam angle for its respective frequency. As noted earlier, the relationship between reference beam frequency and the optimum reference beam angle is well known to those in the art and hence need not be explained. Suffice it to say that the optimum difference in reference beam angles $R_1$ is a few milliradians and is best determined experimentally.

Any suitable optical arrangement may be employed for directing the scene beam 22 and the reference beams 30, 32 to the object 12 and the recording medium 26. In the recording apparatus illustrated, the scene beam 22 is reflected by a front surface mirror 34 through a diverging lens 35 to the object 12. The object scatters and reflects the light of the scene beam to the recording medium 26. The reference beam 24 reflected from the beam splitter 20 is reflected by a front surface mirror 36 to the polarization beam splitter 28. The $R_2$ reference beam 30 from the beam splitter 28 is reflected to the recording medium 26 at the proper reference beam angle for its respective frequency by front surface mirrors 38, 40 and 42. The $R_1$ reference beam 32 from the polarization beam splitter 28 is reflected to the recording medium at the optimum reference beam angle for its particular frequency by a front surface mirror 46 and the mirrors 38, 40, and 42.

The laser oscillator 14 may be operated to generate the $R_1$ and $R_2$ frequencies simultaneously or consecutively. In each operating mode, the laser oscillator effectively produces a multifrequency output beam, i.e., source beam 18, containing both the $R_1$ and $R_2$ frequencies. In the simultaneous mode, these frequencies occur simultaneously in the source beam. In the consecutive mode, the two frequencies occur consecutively in the source beam.

The operation of the holographic contouring apparatus 10 is obvious from the foregoing description. Thus, the multifrequency coherent source beam 18 from the laser oscillator 14 is split by the beam splitter 20 into the multifrequency scene and reference beams 22, 24. The scene beam 22 is directed to the object 12 to illuminate the latter and thereby effect exposure of the recording medium 26 by the multifrequency light, i.e., $R_1$ and $R_2$ light, reflected from the object. The multifrequency reference beam 24 is split by the polarization beam splitter 28 into the two single frequency, i.e., $R_1$ and $R_2$, reference beams 30, 32. These reference beams are directed to the recording medium 26 at their respective optimum reference beam angles to record on the medium a contour hologram of the object 12. The holographic contour image or map reconstructed from this hologram displays contour fringes defining the surface contour of the object. As noted earlier, the contour fringe spacing is determined by the difference in wavelengths of the recording frequencies used.

Turning now to FIG. 2, the multifrequency laser oscillator 14 has an optical cavity 48 which is a Y cavity including three legs 50, 52 and 54. For convenience, cavity leg 50 is referred to as a front leg and the cavity legs 52 and 54 as rear legs. Located in the front cavity leg 50 is an output reflector 56, such as a pair of sapphire plates. Rear cavity leg 52 contains a lasing medium 58 and a rear reflector 60. Rear cavity leg 54 contains a lasing medium 62 and a rear reflector 64. A pumping means 66 is provided for each lasing medium. Located at the juncture of the cavity legs 50, 52, 54 is an intercavity etalon 68 which is utilized in both its transmission mode and its reflection mode.

The lasing media 58, 62 will be described presently. Suffice it to say at this point that lasing medium 58, when pumped, produces a beam 70 of coherent light of one of the optical frequencies, i.e., $R_2$ frequency, selected for recording contour holograms. Lasing medium 62 produces a beam 72 of coherent light of the other selected recording frequency, i.e., $R_1$ frequency. Etalon 68 is uniquely constructed and arranged in accordance with the invention, such that it transmits the $R_2$ beam 70 from the lasing medium 58 and reflects the $R_1$ beam 72 from the lasing medium 62 to the output reflector 56. As noted earlier, the $R_1$ and $R_2$ frequencies are orthogonally polarized (a result of the transition probabilities of the ruby rods). Operation of the etalon 68, however, is not dependent on this different polarization.

Laser oscillator 14 thus effectively comprises two separate laser oscillators sharing a common output reflector. One of these separate oscillators comprises the lasing medium 58 and cavity end reflectors 56, 60. The other separate oscillator comprises the lasing medium 62 and cavity end reflectors 56, 64. The two coherent beams 70, 72 of these separate oscillators combine to form the source beam 18 which thus contains both the vertically polarized light of one recording frequency generated by lasing medium 58 and the horizontally polarized light of the other recording frequency generated by lasing medium 62.

Before proceeding further with a prescription of the laser oscillator 14, it is worthwhile to briefly discuss the lasing characteristics of a lasing medium. As is well known to those versed in the laser art and as also discussed in U.S. Pat. Nos. 3,603,684 and 3,603,685, a lasing medium, when optically pumped, produces coherent light at one or more spectroscopic transitions or lasing lines of the medium. The coherent light produced at each line or transition has a frequency spectrum comprising a plurality of discrete optical frequency components that extend throughout the frequency range of the spectrum. This frequency range is defined as the lasing line width of the medium which represents the gain of the medium as a function of wavelength or frequency. It is also known to provide a laser, which utilizes a multiple transition lasing medium (i.e., a medium such as ruby having two spectroscopic transitions or lasing lines) with means for selecting either transition as well as a particular frequency or particular frequencies of the selected transition, such that light amplification and emission occur only at the selected frequency or frequencies of the selected transition. The earlier mentioned copending applications disclose lasers of this kind.

In the particular embodiment of the invention illustrated, each lasing medium 58, 62 is a multi-transition medium which produces light at two spectroscopic transitions that create the two optical frequencies $R_1$, and $R_2$ to be used for holographic contouring. The intercavity etalon 68 is utilized to select the $R_2$ frequency of medium 58 and $R_1$ frequency of medium 62. To this end, the etalon is constructed and arranged at an angle such that it transmits between the lasing medium 58 and the output reflector 56 substantially only coherent light of the $R_2$ frequency or frequency range to cause that medium to lase at the $R_2$ recording frequency. Similarly, the etalon reflects coherent light between the lasing medium 62 and the output reflector 56 substantially only at the $R_1$ frequency or frequency range to cause the latter medium to lase at the $R_1$ recording frequency. In other words, the combined gain of the etalon 68 in its transmission mode and the lasing medium 58 exceeds the lasing threshold of the medium only at $R_2$ transition or frequency of the medium and the combined gain of etalon in its reflecting mode and the medium 62 exceeds the lasing threshold of the latter medium only at the $R_1$ transition or frequency of the medium. These two recording frequencies are selected to yield the desired contour fringe spacing in the reconstructed holographic image or map. In this regard, attention is again directed to U.S. Pat. Nos. 3,603,684 and 3,603,685 which explain the relationship between recording frequency or wavelength and contour fringe spacing.

As noted earlier and will be evident as the description proceeds, a variety of lasing media may be employed in the laser oscillator 14. The preferred lasing media for holographic contouring are pink rubies with chromium ions dissolved, with a concentration on the order of 0.03 to 0.05 percent in a sapphire ($Al_2O_3$) host for the reason that they yield a desirable contour fringe spacing in the reconstructed holographic contour image or map.

In this regard, it is well known that ruby both fluoresces and absorbs in the red end of the visible spectrum. The fluorescence and resonance absorption is a doublet, i.e., involves two spectroscopic transitions, of 15 Angstroms separation. The longer wavelength spectroscopic transition or line is now known as the $R_1$ line while the shorter wavelength spectroscopic transition or line is the $R_2$ line. The red fluorescent doublet is a by-product of the absorption of light in the blue and green portions of the spectra. The fluorescence is extremely efficient (~0.8), with the result that nearly every excited atom decays via fluorescence.

The fluorescent lifetime of ruby is 3.8 milliseconds. The property of simultaneous absorption and fluorescence at the same wavelength classifies ruby as a three-level laser material.

Ruby laser crystals absorb resonance or fluorescence light according to the following expression, namely, $$I_t = I_o \exp{(N_1 - N_2)\sigma l},$$

where
$I_t$ is the intensity of light transmitted through a crystal of thickness $l$, (watts)
$I_o$ is the intensity of light incident on the crystal, (watts)
$N_1$ is the number of unexcited or ground state atoms per unit volume, (unexcited atoms per unit volume)
$N_2$ is the number of excited ($R_1$ or $R_2$ atoms) per unit volume, (excited atoms per unit volume)
$\sigma$ is the cross-section for the absorption and emission of radiation; it is a function of the polarization of light relative to the crystal axis of ruby. and $l$ is the physical length of the sample. In the unexcited state, all of the atoms of a crystal are in the ground state and the crystal is absorptive of light resonant to either the $R_1$ or $R_2$ transitions. Under high excitation due to an intense flash of blue-green light, the number of atoms in the upper state can briefly exceed the number in the lower state. The crystal is no longer an absorber of resonance radiation, but instead has gain. When an optical resonator is added, the combination oscillates at the longitudinal modes of the resonator.

With an optical resonator having conventional broadband reflectors, ruby lasers normally emit or oscillate only at wavelengths permitted by the $R_1$ fluroescent line width, that is only at the $R_1$ spectroscopic transition of a ruby. Oscillation at the $R_2$ transition or wavelength does not normally occur. However, oscillation at the $R_2$ wavelength can be achieved by thwarting the gain at the $R_1$ wavelength. The reason why rubies normally oscillate at the wavelength of the $R_1$ energy level is that this level is below the $R_2$ level and is more densely populated (by thermodynamic arguments). The $R_1$ and $R_2$ levels are connected so that the $R_1$ population is maintained from the $R_2$ level.

In the particular laser oscillator 14 shown, the lasing media 58, 62 are rubies and the pumping means 66 are flash lamps, such as Xenon flash lamps, surrounded by cylindrical reflectors. The cavity end reflectors 60, 64 are 99 percent broadband reflectors. Etalon 68 is tuned and angularly positioned to select the $R_2$ wavelength of ruby 58 and the $R_1$ wavelength of ruby 62. That is to say, the etalon is tuned and angularly positioned relative to the axis of ruby 58 to transmit between the ruby and the output reflector 56 substantially only coherent light of the $R_2$ wave length to cause lasing of this ruby at the $R_2$ wavelength. The etalon is angularly positioned relative to the axis of ruby 62 to reflect between this ruby and the output reflector 56 coherent light of the $R_1$ wavelength and to transmit or reflect from the laser cavity 58 other light wavelengths of the ruby 62 so as to cause lasing of the latter ruby at the $R_1$ wavelength.

Etalon 46 may be constructed from a pair of standard dielectric coated laser reflectors with broadband reflecting surfaces. From the well known Fabry-Perot resonance condition $$M\lambda = 2T$$

where

T is the distance between reflecting suraces,
M is an integer, and
λ is the light wavelength, it follows that the separation of the reflecting surfaces can be chosen so that one wavelength $\lambda_2$ is intermediate the resonances of another wavelength $\lambda_1$.

The wavelength separation between the $\lambda_1$ resonances of the etalon is $$\Delta\lambda_1 = -\lambda_1^2/2T$$

where T is the separation.

For the $\lambda_2$ wavelength to be intermediate these two resonances, $$\lambda_1 = \lambda_2 + \Delta\lambda_1/2$$
$$= \lambda_2 - \lambda_1^2/4T$$

Solving gives a surface spacing of $$T = \lambda_1^2/4(\lambda_1 - \lambda_2)\ \lambda^2/4\ \Delta\lambda$$

which puts the $\lambda_2$ resonances intermediate the $\lambda_1$ resonances. Substituting the room temperature wavelength values for the $R_1$ and $R_2$ wavelengths gives a surface separation L $$L = 0.48/4(15)\ CM = 80\ \text{microns}$$
$$= 0.0314\ \text{inches}.$$

Etalon 68, when thus tuned, may be angularly oriented relative to the axes of the rubies 58, 62 to select the $R_2$ transition or wavelength of the ruby 58 and the $R_1$ transition or wavelength of the ruby 62 by transmission and reflection in the manner explained. The relationship between the angle of such an etalon and its reflection and transmission characteristics is well known to those versed in the art and hence need not be elaborated on this disclosure. Suffice it to say that selection of the $R_2$ wavelength of ruby 58 and the $R_1$ wavelength of ruby 62, as described, is accomplished with angles α between the etalon surfaces and the axes of rubies 58, 62 on the order of 82.5°–84°.

It is now apparent that the laser oscillator 14 generates the multifrequency coherent output or source beam 18 containing both the $R_1$ and $R_2$ frequencies or wavelengths of ruby resonant fluorescence. This source beam is utilized in the holographic contouring apparatus 10 for recording contour holograms of the object 12. As noted in the earlier description of the apparatus, the $R_1$ and $R_2$ frequencies must be orthogonally polarized to permit their separation by the polarization beam splitter 28 into the separate reference beams 30, 32. Such orthogonal polarization of the $R_1$ and $R_2$ frequencies is accomplished by orienting the cyrstal axes of the rubies 58, 62 at right angles to one another. Thus, the crystal axis of ruby 58 is perpendicular to the plane of FIGS. 1 and 2 and the crystal axis of ruby 62 is parallel to the plane of these figures.

In operation of the holographic contouring apparatus 10, the rubies 58, 62 are pumped either simultaneously or consecutively to produce the polarized multifrequency source beam 18 which is split into the scene and reference beams 22, 30, 32 to record a contour hologram of the object 12 on the recording medium 26 by the $R_1$ and $R_2$ light frequencies. The contour map reconstructed from this hologram displays contour fringes with a spacing on the order of 172 microns. It is evident that laser 14 may be used in the contour hologram recording apparatus of the earlier mentioned copending applications, in which case the planes of the ruby crystal axes may be parallel to produce parallel polarized $R_1$ and $R_2$ frequencies.

What is claimed as new in support of Letters Patent is:

1. The method of producing a coherent light beam comprising the steps of:
    generating a first coherent light beam containing substantially only light which is produced by a first spectroscopic transition of an active lasing material and is polarized in a first direction;
    generating a second coherent light beam containing substantially only light which is produced by a second spectroscopic transition of said lasing material and is polarized in a second direction; and
    directing said first and second beams along a common path to form essentially a single output beam comprising two coherent light components having differing directions of polarization and differing wavelengths corresponding to said spectroscopic transitions, respectively.

2. The method according to claim 1 wherein:
    said lasing material is ruby; and
    said first and second spectroscopic transitions are the $R_1$ and $R_2$ transitions of ruby.

3. The method according to claim 1 wherein:
    said first and second beams are generated by effecting lasing at said spectroscopic transitions, respectively, of first and second crystals of said active lasing material having differently oriented crystal axes.

4. The method according to claim 1 including the additional step of:
    optically splitting said output beam into two separated polarized output beams each containing substantially only one of said coherent light components.

5. The method according to claim 1 wherein:
    said first and second coherent beams are generated simultaneously.

6. The method according to claim 1 wherein:
    said first and second coherent beams are generated consecutively.

7. The method of producing coherent scene and reference light beams for recording contour holograms, comprising the steps of:
    generating a coherent light beam containing light of a first optical frequency which is polarized in a first direction and light of a second optical frequency which is polarized in a second direction;
    optically splitting said generated beam into a scene beam and a reference beam each containing said polarized light of said first and second frequencies; and
    optically splitting said reference beam into two separate reference beams each containing substantially only one of said frequencies.

8. The method according to claim 7 wherein:
    said first and second frequencies are generated simultaneously to produce said separate reference beams simultaneously.

9. The method according to claim 7 wherein:
    said first and second frequencies are generate consecutively to produce said separate reference beams consecutively.

10. The method according to claim 7 wherein:
said generated beam is generated with a ruby laser; and
said first and second frequencies correspond to the $R_1$ and $R_2$ transitions of the laser ruby.

11. The method of recording a contour hologram of an object on a holographic recording medium, comprising the steps of:
generating a coherent light beam containing light of a first optical frequency which is polarized in a first direction and light of a second optical frequency which is polarized in a second direction;
optically splitting said beam into a scene beam and a reference beam each containing said light of said first and second frequencies;
optically splitting said reference beam into two separate reference beams each containing substantially only light of one of said frequencies;
directing said scene beam onto said object to illuminate the object with the multifrequency light of said scene beam; and
directing each separate reference beam onto said recording medium at the optimum reference beam angle for the respective reference beam frequency.

12. The method according to claim 11 wherein:
said first and second frequencies are generated simultaneously to produce said separate reference beams simultaneously.

13. The method according to claim 11 wherein:
said first and second frequencies are generated consecutively to produce said separate reference beam consecutively.

14. The method according to claim 11 wherein:
said generated beam is generated with a ruby laser; and
said first and second frequencies correspond to the $R_1$ and $R_2$ transitions of the laser ruby.

15. The method of generating a polarized multifrequency coherent light beam comprising the steps of:
effecting lasing of first and second solid lasing media having differently oriented crystal axes at first and second optical frequencies, respectively, in such a way that the light beam from said first lasing medium is polarized in one direction and the light beam from said second lasing medium is polarized in a second direction; and
combining the light beams from said lasing media into a single multifrequency beam.

16. The method according to claim 15 wherein:
said lasing media are rubies; and
said frequencies correspond to the $R_1$ and $R_2$ transitions of the rubies.

17. Apparatus for producing two coherent light beams of different optical frequencies comprising:
laser means for generating a multifrequency coherent light beam containing light of a first optical frequency which is polarized in a first direction and light of a second optical frequency which is polarized in a second direction; and
a polarization beam splitter in the path of said multifrequency beam which transmits substantially only light polarized in said first direction to provide a first output beam containing substantially only light of said first frequency and reflects substantially only light polarized in said second direction to provide a second output beam containing substantially only light of said second frequency.

18. Apparatus according to claim 17 wherein:
said laser means comprises a ruby laser; and
said first and second frequencies correspond to the $R_1$ and $R_2$ transitions of the laser ruby.

19. Apparatus according to claim 17 wherein:
said laser means comprises active lasing means, means for effecting lasing of said lasing means at said first and second frequencies, and means for effecting polarization of the coherent light from said lasing means in such a way that the light of said first frequency is polarized in said first direction and light of said second frequency is polarized in said second direction.

20. Apparatus according to claim 17 wherein:
said laser means comprises first and second solid lasing media, such as rubies, having differently oriented crystal axes, means for effecting lasing of said lasing media at said first and second frequencies, respectively, in such a way that the light beam from said first lasing medium is polarized in said first direction and the light beam from said second lasing medium is polarized in said second direction, and optical means for combining said latter beams to form said multifrequency beam.

21. Apparatus according to claim 17 wherein:
said laser means comprises means for generating said first and second frequencies simultaneously, to produce said output beams simultaneously.

22. Apparatus according to claim 17 wherein:
said laser means comprises means for generating said first and second frequencies consecutively to produce said output beams consecutively.

23. Apparatus for producing coherent scene and reference light beams for recording contour holograms, comprising:
laser means for generating a coherent light beam containing light of a first optical frequency which is polarized in a first direction and a light of a second optical frequency which is polarized in a second direction;
optical means for splitting said generated beam into a scene beam and a reference beam each containing said polarized light of said first and second frequencies; and
a polarization beam splitter in the path of said reference beam which transmits substantially only light polarized in said first direction to provide a first separate reference beam containing substantially only light of said first frequency and reflects substantially only light polarized in said second direction to provide a second separate reference beam containing substantially only light of said second frequency.

24. Apparatus according to claim 23 wherein:
said laser means comprises means for generating said first and second frequencies simultaneously to produce said separate reference beams simultaneously.

25. Apparatus according to claim 23 wherein:
said laser means comprises means for generating said first and second frequencies consecutively to produce said separate reference beams consecutively.

26. Apparatus according to claim 23 wherein:

said first generated beam is generated with a ruby laser; and said first and second frequencies correspond to the $R_1$ and $R_2$ transitions of the laser ruby.

27. Apparatus for recording a contour hologram of an object on a holographic recording medium, comprising:

laser means for generating a coherent light beam containing light of a first optical frequency which is polarized in a first direction and light of a second optical frequency which is polarized in a second direction;

means for optically splitting said beam into a scene beam and a reference beam each containing said polarized light of said first and second frequencies;

a polarization beam splitter in the path of said generated beam which transmits substantially only light polarized in said first direction to provide a first separate reference beam containing substantially only light of said first frequency and reflects substantially only light polarized in said second direction to provide a second separate reference beam containing substantially only light of said second frequency;

means for directing said scene beam onto said object to illuminate the object with the multifrequency light of said scene beam; and means for directing each separate reference beam onto said recording medium at the optimum reference beam angle for the respective reference beam frequencies.

28. Apparatus according to claim 27 wherein:

said laser means comprises means for generating said first and second frequencies simultaneously to produce said separate reference beams simultaneously.

29. Apparatus according to claim 27 wherein:

said laser means comprises means for generating said first and second frequencies consecutively to produce said separate reference beams consecutively.

30. Apparatus according to claim 27 wherein:

said first mentioned multifrequency beam is generated with a ruby laser; and said first and second frequencies correspond to the $R_1$ and $R_2$ transitions of the laser ruby.

31. A laser oscillator for generating a polarized multifrequency coherent light beam, comprising:

means for generating a first coherent light beam containing substantially only light of a first optical frequency which is polarized in a first direction;

means for generating a second coherent light beam containing substantially only light of a second optical frequency which is polarized in a second direction; and means for directing said first and second beams along a common path to form essentially a single output beam containing both of said frequencies.

32. A laser oscillator according to claim 31 wherein:

each of said beam generating means comprises a solid lasing medium, and the lasing media having differentially oriented crystal axes.

33. A laser oscillator comprising:

first and second solid lasing media;

an optical cavity containing said lasing media including means for effecting lasing of said first and second lasing media at first and second optical frequencies, respectively, and means for combining the light beams from said lasing media into a single multifrequency output beam;

said optical cavity having three legs intersecting at a common juncture including a front leg containing an output reflector, a first rear leg containing said first lasing medium and a first cavity rear end reflector, and a second rear leg containing said second lasing medium and a second cavity rear end reflector; and said means for effecting lasing of said lasing media at said optical frequencies comprising an intercavity etalon at the juncture of said cavity legs which transmits light of said first frequency between said output reflector and first lasing medium to effect lasing of said first medium at said first frequency and reflects light of said second frequency between said output reflector and said second medium to effect lasing of said second medium at said second frequency.

34. A laser oscillator comprising:

first and second solid lasing media;

an optical cavity containing said lasing media including means for effecting lasing of said first and second lasing media at first and second optical frequencies, respectively, and means for combining the light beams from said lasing media into a single multifrequency output beam; and said media having their crystal axes oriented in different planes in such a way that the light beam from said first lasing medium is polarized in one direction and the light beam from said second lasing medium is polarized in a second direction.

35. In a holographic contouring apparatus for recording a contour hologram of an object utilizing a coherent light beam containing light of a first optical frequency which is polarized in a first direction and light of a second optical frequency which is polarized in a second direction, the combination comprising:

means for optically splitting said beam into a scene beam and a reference beam, each containing said polarized light of said first and second frequencies;

a polarization beam splitter in the path of said generated beam which transmits substantially only light polarized in said first direction to provide a first separate reference beam containing substantially only light of said first frequency and reflects substantially only light polarized in second second direction to provide a second separate reference beam containing substantially only light of said second frequency;

means for directing said scene beam onto said object to illuminate the object with the multifrequency light of said scene beam; and means for directing each separate reference beam onto said recording medium at the optimum reference beam angle for the respective reference beam frequencies.

* * * * *